Figure 1:
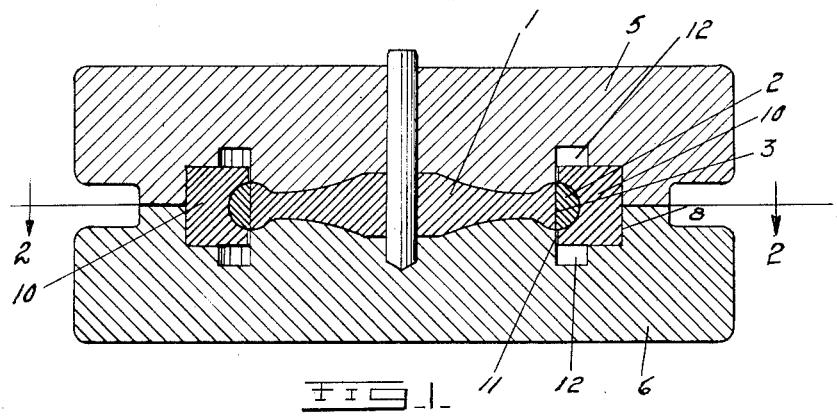

Aug. 14, 1928.

E. S. TEED 1,680,823

PROCESS OF MANUFACTURING COMPOSITE RUBBER WHEELS OR OTHER ARTICLES

Filed Nov. 2, 1927

INVENTOR.
EARL S. TEED

BY

ATTORNEY.

Patented Aug. 14, 1928.

1,680,823

UNITED STATES PATENT OFFICE.

EARL S. TEED, OF AKRON, OHIO, ASSIGNOR TO THE TEXTILE RUBBER COMPANY, OF AKRON, OHIO, A CORPORATION OF OHIO.

PROCESS OF MANUFACTURING COMPOSITE RUBBER WHEELS OR OTHER ARTICLES.

Application filed November 2, 1927. Serial No. 230,476.

The present invention relates to the manufacture of composite articles of rubber having a portion thereof made of hard rubber and a portion of so-called soft or resilient rubber. While the invention is shown and described as applied to the manufacture of wheels for toys or small vehicles and certain claims thereof are specifically described to the manufacture of wheels with a solid body and a soft yielding rim, the principles of the invention may be applied to many other articles in which diverse rubber compounds are intended to be vulcanized simultaneously.

The difficulty which has been experienced heretofore in the manufacture of composite rubber articles of diverse rubber compositions has been in maintaining the proper line of division between the two grades or qualities of rubber, the rubber stock of one type tending to flow into the rubber stock of the other type, displacing the same and forming an unsatisfactory product. In attempts to manufacture wheels such as shown in this application in a single curing operation, the hard rubber body would frequently penetrate into the soft rubber outer rim or periphery of the wheel and thereby form a hard outer surface on the wheel, or the softer rubber would penetrate the hard rubber stock in the body of the wheel and destroy its utility for the purposes for which the wheel is designed. As a result, it has never been practical to make this type of article in a single vulcanizing operation and a two-cure method has always been employed.

By the method shown herein and by the use of the specific apparatus, solid rubber wheels, casters, or disks having soft rubber outer peripheries may be made by a single vulcanizing operation, so that one stock does not penetrate the other stock and a perfect line of division is maintained across the wheel.

It will be appreciated, from what has been stated in a general way as the purpose and objects to be accomplished by the invention, that the claims hereof which are not directed specifically to the manufacture of wheels are intended to be broad enough to cover analogous processes and uses.

Figure 2:
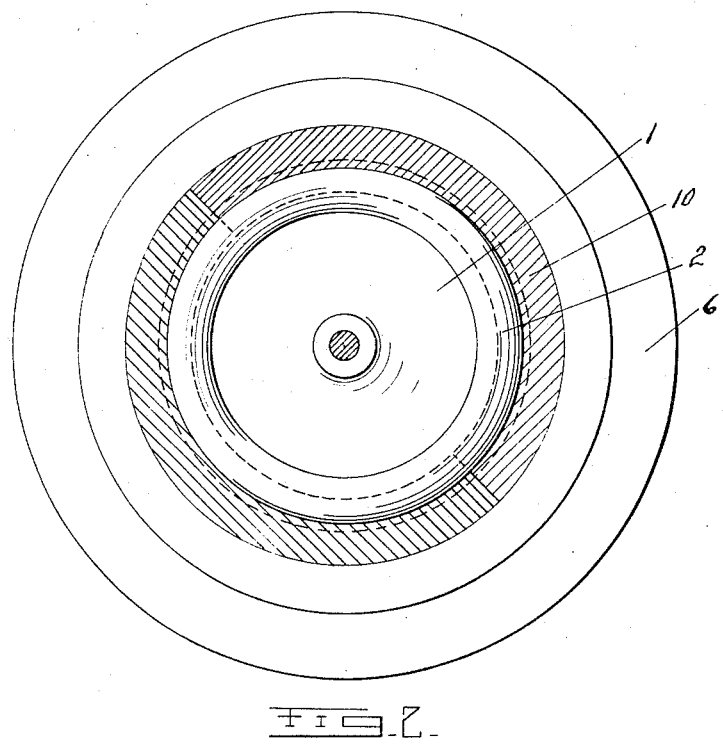

In the drawing accompanying this application:

Figure 1 is a vertical sectional view of a mold showing an all-rubber wheel therein; and Figure 2 is a horizontal section on the line 2—2 of Figure 1.

The wheel or disk comprises a body or central portion 1 which is composed of hard rubber and an outer rim or periphery 2 of softer rubber. This type of wheel is used in many devices, but particularly in toys or toy vehicles, in which it is desired to form a hard rubber center and a yielding outer rim thereon for the purpose of deadening the noise and preventing injury to floor, walls, or furniture. The structure of the wheel is shown substantially accurately in the drawing, attention being directed to the line of division 3 between the hard and soft rubber portions of the wheel, which is maintained in substantially a straight line across the wheel.

The means by which this result is obtained is by providing outlet or overflow cavities in alignment with the line of division between the rubbers which is to be maintained across the wheel. It has been the practice in making molds for wheels or disks to divide the mold along the central plane of the wheel and, as a result, the movement of the stock toward the overflow provided by the line of division between the mold sections has caused a penetration of the hard rubber stock in the outer rim of the wheel.

In the present invention, however, the mold is composed of upper and lower sections or platens 5 and 6 which form the body of the wheel. These sections are recessed, as at 8, and in the recess is seated the outer portion of the wheel mold, or that part which forms the rim of the wheel. This in in the form of a ring 10 which extends about the side of the wheel rim providing outlet or overflow passages 11 which lead to overflow cavities 12 in the mold sections. The ring 10 may be solid if desired, or it may be divided into two sections as shown in Figure 2 to permit easy removal of the completed article.

In the manufacture of wheels by the present process, the rubber composition to form the hard rubber body of the wheel is placed in the main cavity of the mold and the softer rubber to form the rim of the wheel is placed in the cavity in the ring 10. The mold is then closed and heat and pressure applied to vulcanize the rubber compositions which are so compounded as to be cured in substantially the same period of time. The expansion of the rubber in vulcanization fills out the entire molding cavity and the excess, which is always provided, finds its way out through the passages 11 into the cavities 12. By providing the overflow cavities in line with the division line which is to be maintained, each rubber body finds its outlet at that line of division and neither will penetrate into the other. The invention gives a perfect product at all times and it is possible to cure these articles at a single operation, which is cheaper and better than prior processes, assuring at all times a firm union between the two portions of the wheel.

What is claimed is:

1. The process of manufacturing composite wheel having a central body portion of hard rubber and an outer rim of soft rubber vulcanized thereon, comprising the steps of assembling the uncured rubber compounded to form such elements of the wheel, confining the rubber about the entire outer surface of the wheel except at points in alignment with the line of division to be maintained between the two portions of the wheel and providing overflow at such points, and vulcanizing the wheel while so confined.

2. The process of manufacturing composite wheels having a central or body portion of rubber of one composition and an outer rim of rubber of another composition, comprising assembling the uncured rubber compounds in substantially their final position, confining such rubber except at a point in alignment with the proposed line of division between the diverse rubber compositions where provision for overflow is provided, and vulcanizing the wheel while so confined.

3. The process of vulcanizing a composite rubber article comprising portions of hard and soft rubbers, comprising assembling the diverse rubber compounds while uncured, subjecting the compounds to heat and pressure to vulcanize them simultaneously, and providing for escape of excess rubber during vulcanization at the desired line of division between the rubbers in the completed article.

4. The process of vulcanizing a composite rubber article comprising portions of rubber having diverse characteristics, comprising assembling the separate compounds while uncured, and subjecting the uncured article to heat and pressure to vulcanize it at a single operation and preventing penetration of one rubber by the other by restricting the flow of the rubber during vulcanization to a zone at the desired point of division between the rubbers in the finished article.

5. The process of vulcanizing a composite rubber article comprising portions of rubber of diverse hardness, comprising forming the sections of the article from appropriate uncured compounds and vulcanizing the article, permitting the rubber to overflow at the regions where said rubber compounds are contiguous, and confining the rubber at all other points about the article.

6. The process of vulcanizing a composite article of diverse rubber compositions, comprising vulcanizing said compositions simultaneously and at the same time inducing an overflow of the rubber at the line of separation between the areas of the diverse compositions.

EARL S. TEED.